US011272543B2

(12) United States Patent
Pannell et al.

(10) Patent No.: US 11,272,543 B2
(45) Date of Patent: Mar. 8, 2022

(54) PHYSICAL LAYER DEVICE THAT CONNECTS TO A SHARED MEDIA AND METHOD FOR OPERATING A PHYSICAL LAYER DEVICE THAT CONNECTS TO A SHARED MEDIA

(71) Applicant: NXP B.V., Eindhoven (NL)

(72) Inventors: Donald Robert Pannell, Cupertino, CA (US); Philip Axer, Hamburg (DE); Sujan Pandey, Waalre (NL)

(73) Assignee: NXP B.V., Eindhoven (NL)

( * ) Notice: Subject to any disclaimer, the term of this patent is extended or adjusted under 35 U.S.C. 154(b) by 85 days.

(21) Appl. No.: 16/232,626

(22) Filed: Dec. 26, 2018

(65) Prior Publication Data
US 2019/0261420 A1 Aug. 22, 2019

Related U.S. Application Data

(60) Provisional application No. 62/633,080, filed on Feb. 21, 2018.

(51) Int. Cl.
H04W 74/08 (2009.01)
H04L 1/00 (2006.01)
H04W 80/02 (2009.01)
H04W 72/04 (2009.01)
H04W 72/10 (2009.01)

(52) U.S. Cl.
CPC ....... *H04W 74/0825* (2013.01); *H04L 1/0041* (2013.01); *H04W 72/0446* (2013.01); *H04W 72/10* (2013.01); *H04W 80/02* (2013.01)

(58) Field of Classification Search
CPC ... H04W 4/48; H04W 72/10; H04W 72/0446; H04W 74/0825; H04W 80/02; H04L 12/413; H04L 2012/40273; H04L 1/0041
See application file for complete search history.

(56) References Cited

U.S. PATENT DOCUMENTS

| 10,694,492 | B2* | 6/2020 | Fujishiro | H04W 76/11 |
| 2001/0055311 | A1* | 12/2001 | Trachewsky | H04L 1/0006 370/445 |
| 2008/0052083 | A1* | 2/2008 | Shalev | H04M 3/487 704/500 |
| 2013/0062966 | A1* | 3/2013 | Verghese | B60L 53/126 307/104 |
| 2014/0016926 | A1* | 1/2014 | Soto | H04J 14/0256 398/16 |
| 2019/0268941 | A1 | 8/2019 | Axer et al. | |

OTHER PUBLICATIONS

U.S. Appl. No. 15/904,382 45 pgs (filed Feb. 25, 2018).

* cited by examiner

*Primary Examiner* — Jianye Wu

(57) ABSTRACT

Embodiments of a device and method are disclosed. In an embodiment, a physical layer (PHY) device that is compatible with the IEEE 802.3 standard and that utilizes carrier-sense multiple access with collision detection (CSMA/CD) for media access control to a shared media is disclosed. The PHY device includes a physical coding sublayer transmitter (PCS-TX), a physical medium attachment transmitter (PMA-TX), a physical coding sublayer receiver (PCS-RX), a physical medium attachment receiver (PMA-RX), and a media access priority manager configured to initiate transmission of an indication of a priority of a frame that is to be transmitted onto the shared media.

15 Claims, 10 Drawing Sheets

PHYSICAL LAYER DEVICE THAT CONNECTS TO A SHARED MEDIA AND METHOD FOR OPERATING A PHYSICAL LAYER DEVICE THAT CONNECTS TO A SHARED MEDIA

CROSS-REFERENCE TO RELATED APPLICATIONS

The current application claims priority to U.S. Provisional Patent Application Ser. No. 62/633,080, filed Feb. 21, 2018, entitled "PHY LEVEL COLLISION AVOIDANCE (PLCA) WITH QOS ENHANCEMENTS," which is incorporated by reference herein.

BACKGROUND

Modern automobiles include various electronic control units (ECUs) that implement, for example, engine control, power train control, airbag systems, antilock brake systems, cruise control, electric power steering, audio systems, window control systems, door control systems, mirror adjustment systems, and battery and recharging systems for hybrid/electric cars. The ECUs communicate with each other in an automobile via in-vehicle network (IVN) technologies such as Ethernet.

Ethernet is a well known network technology and the Institute of Electrical and Electronic Engineers (IEEE) 802.3 Working Group is a collection of standards that define physical layer and data link layer media access control (MAC) for wired Ethernet. An emerging IEEE standard that may be particularly applicable to in-vehicle networks is IEEE 802.3cg, which is a protocol for 10 Mb/s single twisted-pair Ethernet that enables multiple nodes to connect to the same twisted-pair, also referred to as a "shared media." The IEEE 802.3cg protocol utilizes CSMA/CD (Carrier Sense Multiple Access, Collision Detection) for media access control. However, CSMA/CD is not deterministic and may not provide the desired performance in in-vehicle networks.

PHY level collision avoidance (PLCA) is an emerging protocol that may be applied in conjunction with IEEE 802.3cg to provide deterministic performance in in-vehicle networks. Although PLCA adds deterministic performance in an IEEE 802.3cg network, applications such as in-vehicle networks may present additional challenges.

SUMMARY

Embodiments of a device and method are disclosed. In an embodiment, a physical layer (PHY) device that is compatible with the IEEE 802.3 standard and that utilizes carrier-sense multiple access with collision detection (CSMA/CD) for media access control to a shared media is disclosed. The PHY device includes a physical coding sublayer transmitter (PCS-TX), a physical medium attachment transmitter (PMA-TX), a physical coding sublayer receiver (PCS-RX), a physical medium attachment receiver (PMA-RX), and a media access priority manager configured to initiate transmission of an indication of a priority of a frame that is to be transmitted onto the shared media.

In an embodiment, the PHY device is compatible with IEEE 802.3cg.

In an embodiment, the media access priority manager is further configured to receive priorities of frames to be transmitted onto the shared media from other PHY devices that are connected to the shared media, and determine whether or not to transmit its frame onto the shared media based on the priority of its frame relative to the priorities of the frames to be transmitted from the other PHY devices.

In an embodiment, the media access priority manager is configured to initiate transmission of its frame if the priority of its frame is higher than the priorities of all the frames to be transmitted from the other PHY devices.

In an embodiment, the media access priority manager is configured to initiate transmission of its frame if the priority of its frame matches a highest priority from the priorities of all the frames to be transmitted from the other PHY devices.

In an embodiment, the media access priority manager is configured to indicate the priority of its frame by transmitting an indication of priority in a media access priority beacon.

In an embodiment, the media access priority manager is configured to learn the priority of its frame through an MII interface.

In an embodiment, the media access priority manager is configured to learn the priority of its frame through a serial peripheral interface (SPI).

In an embodiment, the media access priority manager is configured to learn the priority of its frame through information in a header of the frame.

An embodiment of a method of operating a physical layer PHY device that is compatible the IEEE 802.3 standard and that utilizes CSMA/CD for media access control to a shared media is disclosed. The method involves identifying a priority of a frame that is to be transmitted onto the shared media from the PHY layer device, and transmitting an indication of the priority of the frame onto the shared media from the PHY device.

In an embodiment of the method, the indication of the priority of the frame is transmitted onto the shared media from the PHY device according to IEEE 802.3cg.

In an embodiment, the method further involves receiving priorities of frames to be transmitted onto the shared media from other PHY devices that are connected to the shared media, and determining whether or not to transmit its frame onto the shared media based on the priority of its frame relative to the priorities of the frames to be transmitted from the other PHY devices.

In an embodiment, the method further involves initiating transmission of its frame if the priority of its frame is higher than the priorities of all the frames to be transmitted from the other PHY devices.

In an embodiment, the method further involves indicating the priority of its frame by transmitting an indication of priority in a media access priority beacon.

In an embodiment, the method further involves learning the priority of its frame through an MII interface.

In an embodiment, the method further involves learning the priority of its frame through a SPI.

In an embodiment, the method further involves learning the priority of its frame through information in a header of the frame.

In an embodiment of the method, the PHY device is compatible with IEEE 802.3cg, and the PHY device includes a physical coding sublayer transmitter (PCS-TX), a physical medium attachment transmitter (PMA-TX), a physical coding sublayer receiver (PCS-RX), a physical medium attachment receiver (PMA-RX), and a media access priority manager configured to initiate transmission of the indication of a priority of a frame that is to be transmitted onto the shared media.

A communications network is disclosed. The communications network includes a shared media, wherein the shared media is a twisted-pair wire, multiple PHY devices connected to the shared media and compatible with the IEEE 802.3 standard and that utilize CSMA/CD for media access control to the shared media, each PHY device including a physical coding sublayer transmitter (PCS-TX), a physical medium attachment transmitter (PMA-TX), a physical coding sublayer receiver (PCS-RX), a physical medium attachment receiver (PMA-RX), and a media access priority manager configured to initiate transmission of an indication of a priority of a frame that is to be transmitted onto the shared media, receive priorities of frames to be transmitted onto the shared media from other PHY devices that are connected to the shared media, and determine whether or not to transmit its frame onto the shared media based on the priority of its frame relative to the priorities of the frames to be transmitted from the other PHY devices.

In an embodiment of the communications network, the media access priority manager is configured to initiate transmission of its frame if the priority of its frame is higher than the priorities of all the frames to be transmitted from the other PHY devices.

Other aspects in accordance with the invention will become apparent from the following detailed description, taken in conjunction with the accompanying drawings, illustrated by way of example of the principles of the invention.

BRIEF DESCRIPTION OF THE DRAWINGS

Throughout the description, similar reference numbers may be used to identify similar elements.

DETAILED DESCRIPTION

It will be readily understood that the components of the embodiments as generally described herein and illustrated in the appended figures could be arranged and designed in a wide variety of different configurations. Thus, the following more detailed description of various embodiments, as represented in the figures, is not intended to limit the scope of the present disclosure, but is merely representative of various embodiments. While the various aspects of the embodiments are presented in drawings, the drawings are not necessarily drawn to scale unless specifically indicated.

The present invention may be embodied in other specific forms without departing from its spirit or essential characteristics. The described embodiments are to be considered in all respects only as illustrative and not restrictive. The scope of the invention is, therefore, indicated by the appended claims rather than by this detailed description. All changes which come within the meaning and range of equivalency of the claims are to be embraced within their scope.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussions of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize, in light of the description herein, that the invention can be practiced without one or more of the specific features or advantages of a particular embodiment. In other instances, additional features and advantages may be recognized in certain embodiments that may not be present in all embodiments of the invention.

Reference throughout this specification to "one embodiment", "an embodiment", or similar language means that a particular feature, structure, or characteristic described in connection with the indicated embodiment is included in at least one embodiment of the present invention. Thus, the phrases "in one embodiment", "in an embodiment", and similar language throughout this specification may, but do not necessarily, all refer to the same embodiment.

Figure 1:
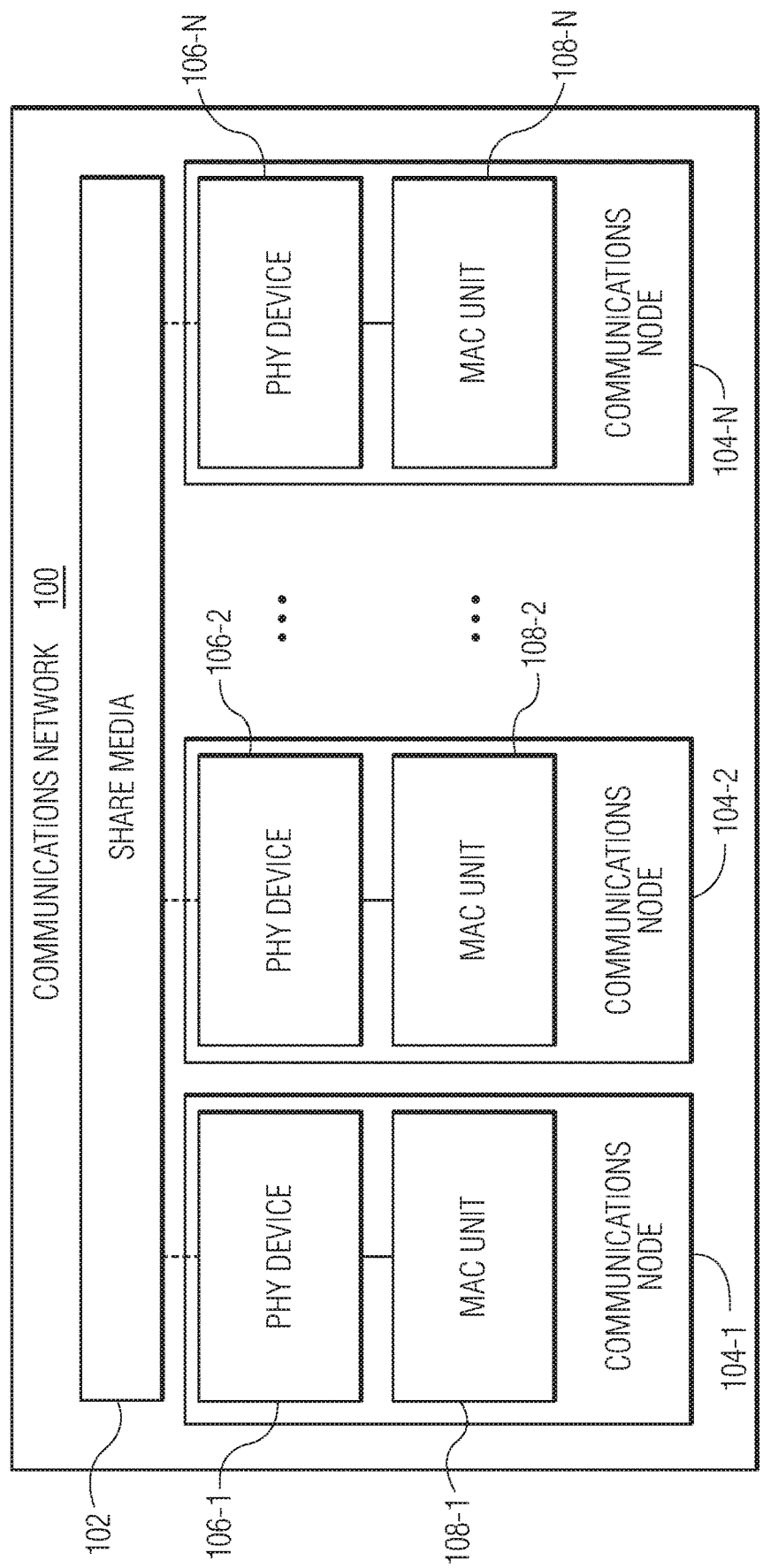
FIG. 1 depicts a communications network that includes multiple communications nodes that communicate through a shared media, such as twisted-pair wires.

FIG. 1 depicts a communications network 100 that includes multiple communications nodes 104-1, 104-2, . . . , 104-N(where N is an integer greater than one) that communicate through a shared media 102, such as twisted-pair wires. In the embodiment of FIG. 1, each communications node includes a corresponding physical layer (PHY) device 106-1, 106-2, . . . , or 106-N (also referred to as a transceiver) and a corresponding media access control (MAC) unit 108-1, 108-2, . . . , or 108-N configured to perform media access arbitration to orchestrate access to the shared media. In an embodiment, the communications nodes may be end nodes that include, for example, various electronic control units (ECUs), such as an engine control module (ECM), a power train control module (PCM), airbags, antilock brakes, cruise control, electric power steering, audio systems, windows, doors, mirror adjustment, battery and recharging systems for hybrid/electric cars, and many more. The communications nodes may also be a node such as an Ethernet bridge. Although the illustrated communications nodes are shown with certain components and described with certain functionality herein, other embodiments of the communications nodes may include fewer or more components to implement the same, less, or more functionality.

In an embodiment, the communications network 100 is an Ethernet network that utilizes CSMA/CD for media access control and that is compatible with the emerging IEEE 802.3cg protocol, which currently specifies a 10 Mb/s single twisted-pair wired communications protocol. The PHY devices 106-1, 106-2, ..., 106-N are configured to manage physical layer communications functions according to the IEEE 802.3cg protocol. For example, the PHY devices transmit analog signals onto the shared media and receive analog signals from the shared media. The PHY devices may also protect other components in the node from extreme electrical conditions, e.g., electrical surges, which may occur on the shared media.

The MAC units 108-1, 108-2, ..., 108-N are configured to perform media access control for the corresponding communications nodes 104-1, 104-2, ..., 104-N. The MAC units may be implemented within a processor, such as a microcontroller, a host processor, a host, a digital signal processor (DSP), or a central processing unit (CPU). In some embodiments, at least one of the MAC units is included within the PHY layer module of an IEEE 802.3cg compatible Ethernet communications device. Although the illustrated MAC units are shown in FIG. 1 as included in the corresponding communications nodes, in some embodiments, the MAC units may be separated from the corresponding communications nodes.

Figure 2:
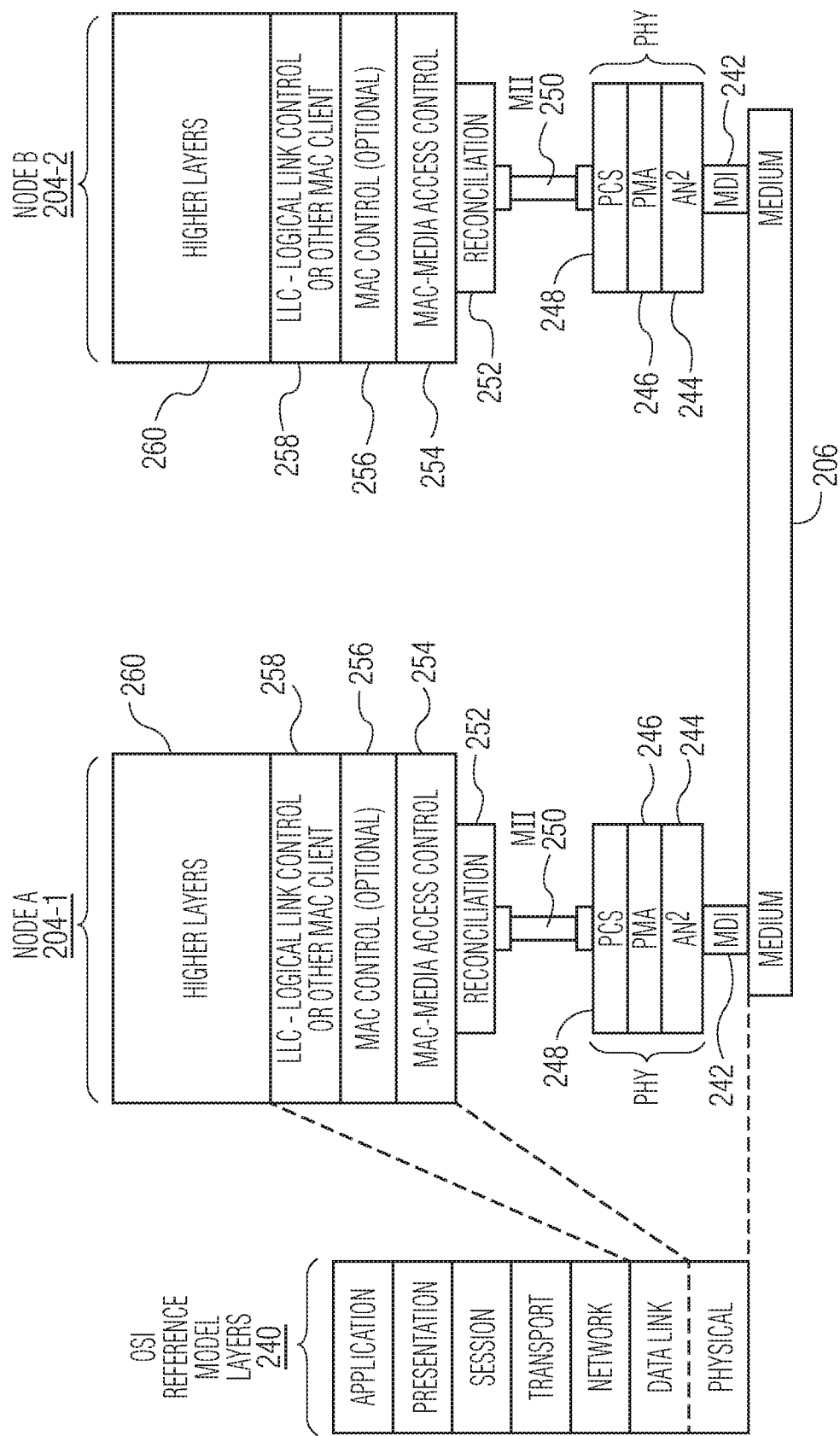
FIG. 2 illustrates the communication of an Ethernet frame between two nodes in an Ethernet based in-vehicle network that also depicts the layers of the OSI reference model.

FIG. 2 illustrates an Ethernet communication network that includes two nodes, node A 204-1 and node B 204-2, in an Ethernet based in-vehicle network that is, for example, compatible with IEEE 802.3cg. FIG. 2 also depicts the layers of the OSI reference model 240 as well as an expanded view of the physical layer and the data link layer. As shown in FIG. 2, the OSI reference model includes the physical layer (also referred to as layer 1 or L1), the data link layer (also referred to as layer 2 or L2), the network layer (also referred to as layer 3 or L3), the transport layer (also referred to as layer 4 or L4), the session layer (also referred to as layer 5 or L5), the presentation layer (also referred to as layer 6 or L6), and the application layer (also referred to as layer 7 or L7). Elements in the expanded view of the physical layer include media-dependent sublayers of the transmission medium 206, a media-dependent interface (MDI) 242, an auto-negotiation layer (AN2) 244, a physical medium attachment (PMA) 246, and the physical coding sublayer (PCS) 248, and media-independent sublayers of a media-independent interface (MII) 250, and a reconciliation sublayer 252. In an embodiment, elements of the PCS, PMA, and AN2 are included in a physical layer chip, often referred to as a "PHY chip" and or simply as a "PHY" as indicated in FIG. 2. Elements in the expanded view of the data link layer include the media access control (MAC) layer 254, the MAC control layer (optional) 256, and the logical link control (LLC) 258, or other MAC client layer. Higher layers 260 may be implemented above the data link layer.

Figure 3:
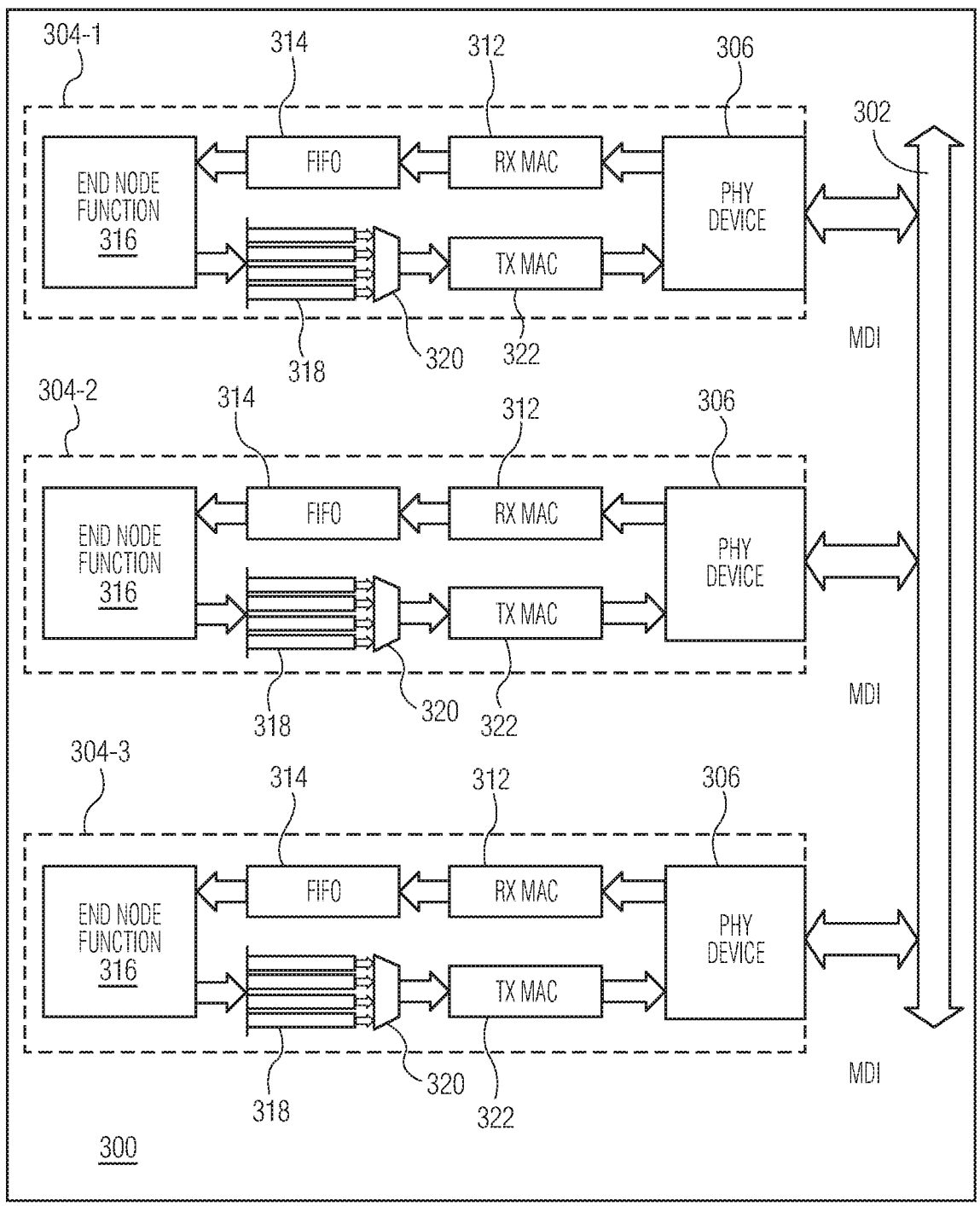
FIG. 3 depicts an expanded view of a communications network that includes three communications nodes that communicate over a shared media according to the IEEE 802.3cg protocol and that may implement PLCA.

FIG. 3 depicts an expanded view of a communications network 300 that includes three communications nodes 304-1, 304-2, and 304-3 that communicate over a shared media 302 according to the IEEE 802.3cg standard. As shown in FIG. 3, each communications node includes a PHY device 306, a receive component of a MAC unit (referred to as an RX MAC 312), a receive FIFO 314, an end node function 316, transmit Quality of Service (QoS) queues 318, a frame selector 320, and a transmit component of a MAC unit (referred to as a TX MAC 322). In some embodiments, the PHY devices 306 of the communications network implement PLCA on the IEEE 802.3cg network. PLCA is implemented at the physical layer and may be integrated with the reconciliation sublayer 252 (FIG. 2). An operational principle of PLCA is that each PHY device is assigned an identifier (ID) that is unique across the shared media and the PHY devices can only transmit data during specific ordered slots that correspond to their respective ID.

In the embodiment of FIG. 3, each communications node 304-1, 304-2, and 304-3 supports the QoS queues 318 in the respective transmit path. In an embodiment, the four QoS queues are configured to queue frames that are to be transmitted from the corresponding communications node and each QoS queue corresponds to a different priority, e.g., high priority, medium priority, normal priority, and low priority, where the priorities are listed in descending priority order. The four QoS queues allow the differentiation of frame priority based upon the QoS queue in which a frame is placed. In a simple QoS use case, the frame selector 320 implements strict priority scheduling to select frames from the QoS queues. In an embodiment, strict priority scheduling dictates that the highest priority queue is always emptied first and only when the highest priority queue is empty will a next lower priority queue be serviced. The next priority queue is serviced until that queue is emptied or until a higher priority queue receives a frame. In deterministic systems, strict priority schedulers are generally used because of their simplicity. To prevent starvation of the lower priority queues, the output of each queue on each node can be rate limited to insure that the respective queues do not transmit more data than they should.

In a target use case, a primary goal is that higher priority frames have the lowest delivery latency, e.g., which needs to be below a determined maximum value. While each frame selector 320 can ensure a particular latency of frame delivery into its own TX MAC 322, a conventional PHY device that is compatible with IEEE 802.3cg (including PHY devices that implement PHY Level Collision Avoidance, also referred to simply as "PLCA") cannot deliver such a differentiated service over the shared media. It may be desirable to be able to achieve a strict priority type of operation (other scheduling algorithms may be possible as well, but strict priority is particularly useful in in-vehicle networks) in an IEEE 802.3cg compliant communications network, including, for example, an IEEE 802.3cg compliant communications network that utilizes PLCA.

One approach to achieving strict priority in an IEEE 802.3cg compliant communications network involves fragmenting queued frames to prevent smaller higher priority frames from getting stuck behind larger (e.g., maximum sized) lower priority frames. Although this approach may work well to prevent smaller higher priority frames from getting stuck behind larger (e.g., maximum sized) lower priority frames, fragmenting queued frames may not provide the desired latency when, for example, on-the-wire priority is not considered. Additionally, fragmenting queued frames in each PHY device requires re-assembly buffers, e.g., one re-assembly buffer for each communications node on the shared media. Since the number of communications nodes on the shared media is only known when the PHY devices are put into use and not when the PHY devices are fabricated, it is impossible to know how many re-assembly buffers a PHY device would need. Also, the size of the buffers would have to be at least the size of two maximum size frames since a frame cannot be sent to a communications node until a previous transmission is complete and the transmissions could all complete at the same time. A second frame buffer may also be needed to receive the frames that may be received while transmitting the frames that were just received. Such an approach not only needs more memory, it may not solve the latency to the target communications node problem.

In accordance with an embodiment of the invention, operating a PHY device that is compatible with the IEEE 802.3 standard and that utilizes CSMA/CD for media access control to a shared media involves identifying a priority of a frame that is to be transmitted onto the shared media from the PHY layer device and transmitting an indication of the priority of the frame onto the shared media from the PHY device. In an embodiment, the PHY device is compatible with IEEE 802.3cg. By transmitting an indication of the priority of a frame onto the shared media from a PHY device, the PHY devices on the shared media are able to know the priorities of the respective PHY devices and can transmit frames in a priority order (e.g., based on PHY level priority arbitration) that ensures that the highest priority frames waiting for access to the shared media are transmitted onto the shared media before lower priority frames. Thus, physical layer quality of service can be implemented in an IEEE 802.3cg compliant communications network.

In an embodiment, operating a PHY device in an IEEE 802.3cg compliant communications network also involves receiving priorities of frames to be transmitted onto the shared media from other PHY devices that are connected to the shared media and determining, at the PHY level, whether or not to transmit its frame onto the shared media based on the priority of its frame relative to the priorities of the frames that are waiting to be transmitted from the other PHY devices. The technique may further involve, at a particular PHY device, initiating transmission of its frame if the priority of its frame is higher than the priorities of all the other frames that are waiting to be transmitted from the other PHY devices on the shared media. In an embodiment, the indication of priority may be transmitted from a PHY device in a media access priority beacon. In an embodiment, the PHY device may learn the priority of its frame from the MAC unit through an MII interface. By sharing frame priorities at the PHY layer, an IEEE 802.3cg compliant communications network can implement a strict priority scheme at the physical layer, thus providing low latency for the highest priority frames.

Figure 4A:
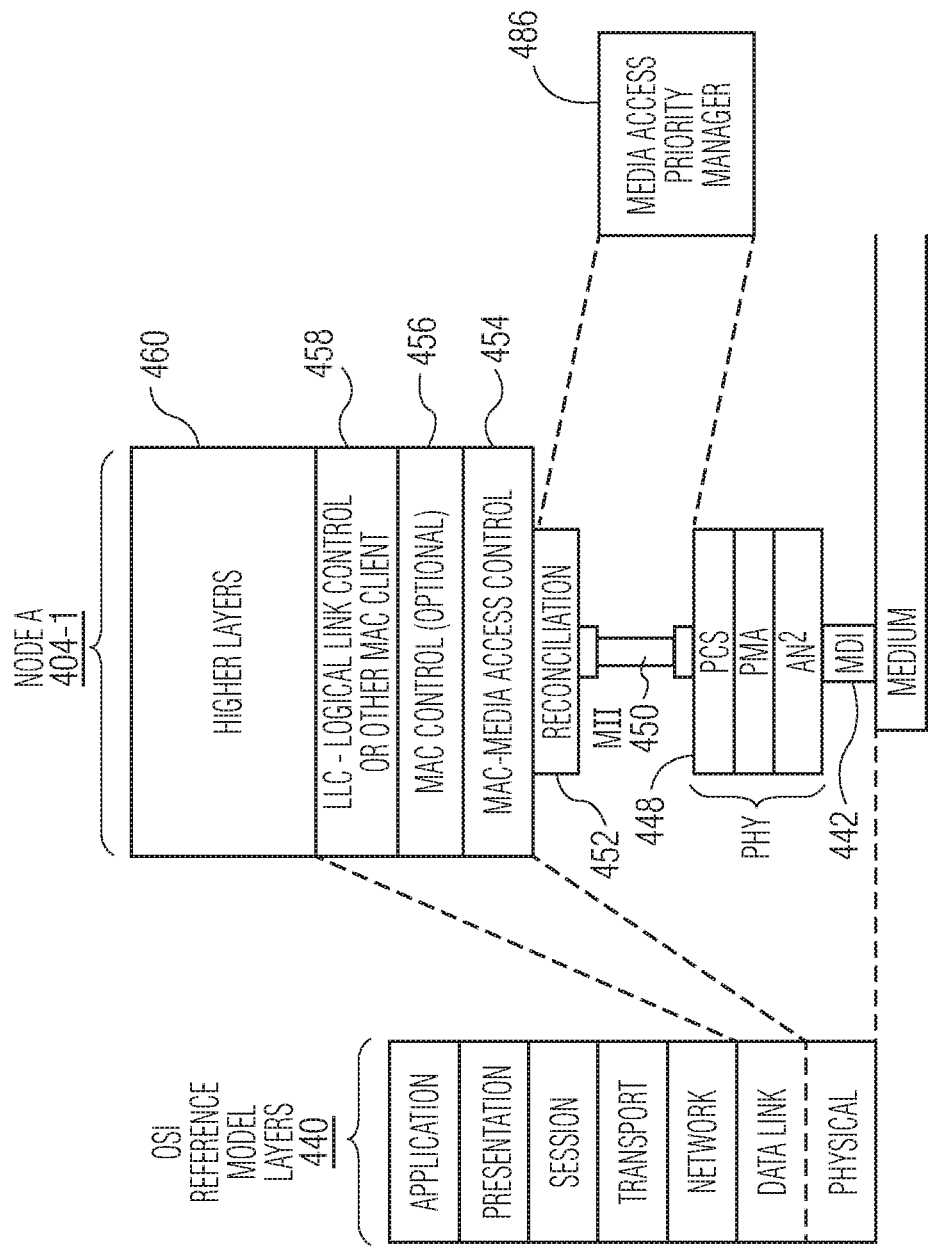
FIG. 4A illustrates the relationship of a media access priority manager relative the OSI model shown in FIG. 2A.

In an embodiment, the above-described technique is implemented at the physical layer (Layer 1) as specified in the OSI reference model. FIG. 4A depicts a media access priority manager 486 that is implemented at the physical layer (Layer 1) to achieve physical layer quality of service functionality. For example, the media access priority manager implements functions to support the sharing of priority information at the physical layer and the arbitration, at the physical layer, amongst priorities received from other nodes on the communications network. The media access priority manager may also implement functions at the physical layer related to learning the priority of frames that are ready for transmission. As illustrated in FIG. 4A, the media access priority manager 486 operates somewhere above the PCS 448 of the physical layer and below the MAC layer 454 of the data link layer.

Figure 4B:
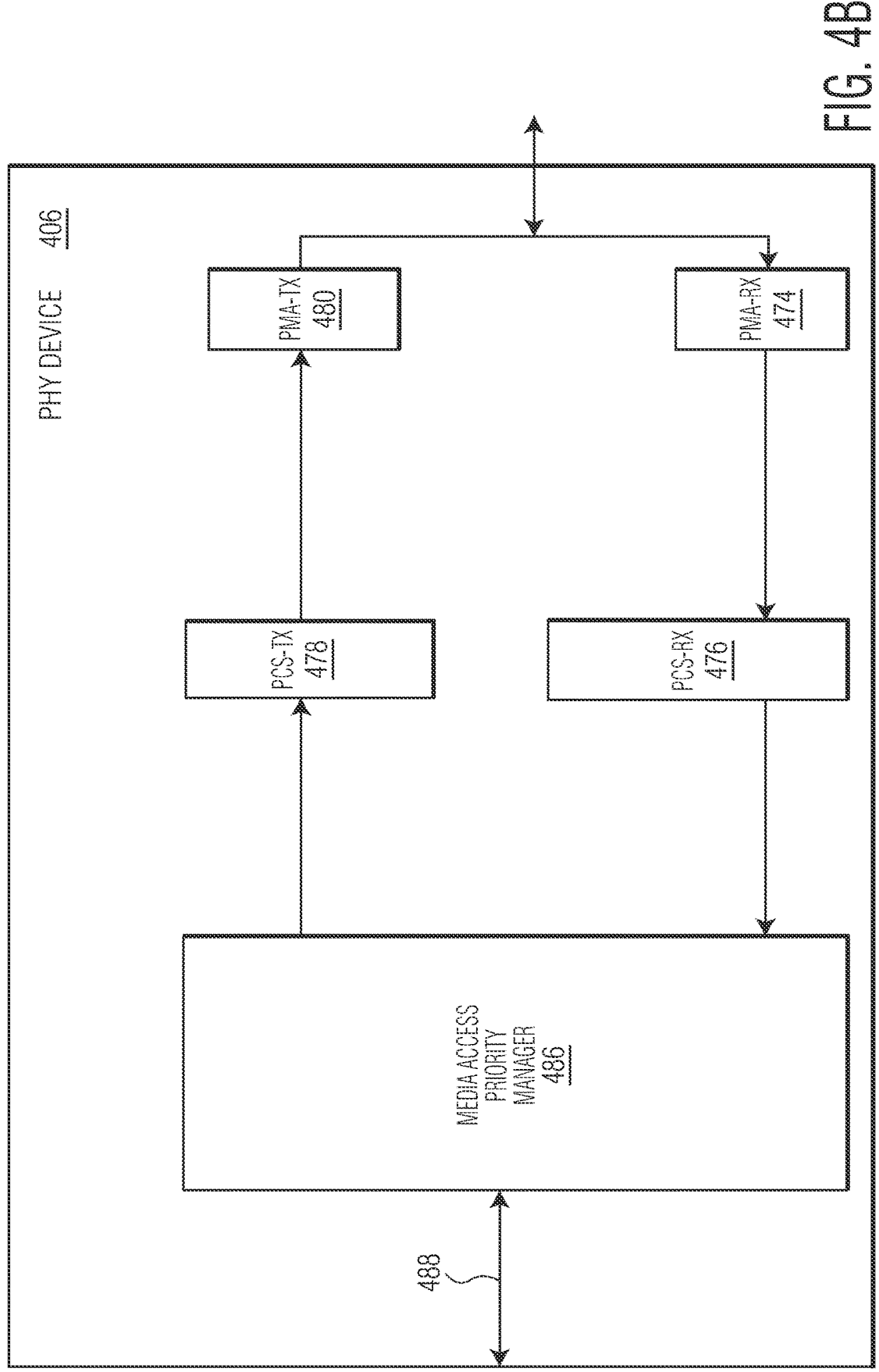
FIG. 4B depicts an embodiment of a PHY device configured to operate in compliance with IEEE 802.3cg that includes a media access priority manager.

FIG. 4B depicts components of a PHY device 406 that is configured to operate in compliance with IEEE 802.3cg (and which may optionally implement PLCA). As shown in FIG. 4B, the PHY device includes a physical medium attachment receiver (PMA-RX) 474, a physical coding sublayer receiver (PCS-RX) 476, a physical coding sublayer transmitter (PCS-TX) 478, a physical medium attachment transmitter (PMA-TX) 480, and a media access priority manager 486. In one embodiment, the PHY device is a standalone PHY chip that is connected to the shared media (e.g., twisted-pair wire) via the PMA-TX and PMA-RX and to another device in the communications node via an interface 488 such as an MII (e.g., reduced media-independent interface (RMII), gigabit media-independent interface (GMII), reduced gigabit media-independent interface (RGMII), 10-gigabit media-independent interface (XGMII) and serial gigabit media-independent interface (SGMII), referred to collectively as "xMII"). In other embodiments, the media access priority manager is connected to another device in the communications node by another interface, such as a serial peripheral interface (SPI).

In an embodiment, the media access priority manager 486 is configured to coordinate the transmission of priority identifiers onto the shared media and to arbitrate among the priorities of the different PHY devices on the shared media based on received priority identifiers. In an embodiment, each PHY device transmits an indication of the priority of the frame (e.g., a "priority advertisement") that the PHY device intends to transmit next onto the shared media. For example, during a current transmission cycle, each PHY device transmits an indication of the priority of the frame that the PHY device intends to transmit in a subsequent (e.g., next) transmission cycle, where a transmission cycle includes a transmission of one frame from each node on the shared media (or at least provides each node an opportunity to transmit one frame per transmission cycle). In a case in which the PHY device implements PLCA, each PHY device, in the PLCA station order (e.g., as indicated by the node ID), transmits an indication of the priority of the frame that the device intends to transmit next onto the shared media. In an embodiment, each PHY device transmits the priority of the frame that the corresponding PHY device intends to transmit in an order dictated by the PHY IDs and after the master PHY issues an "advertise beacon." For example, the priority information indicates one of four priorities, high, medium, normal, and low, although other priority conventions and number of different priorities can be used.

Figure 5:
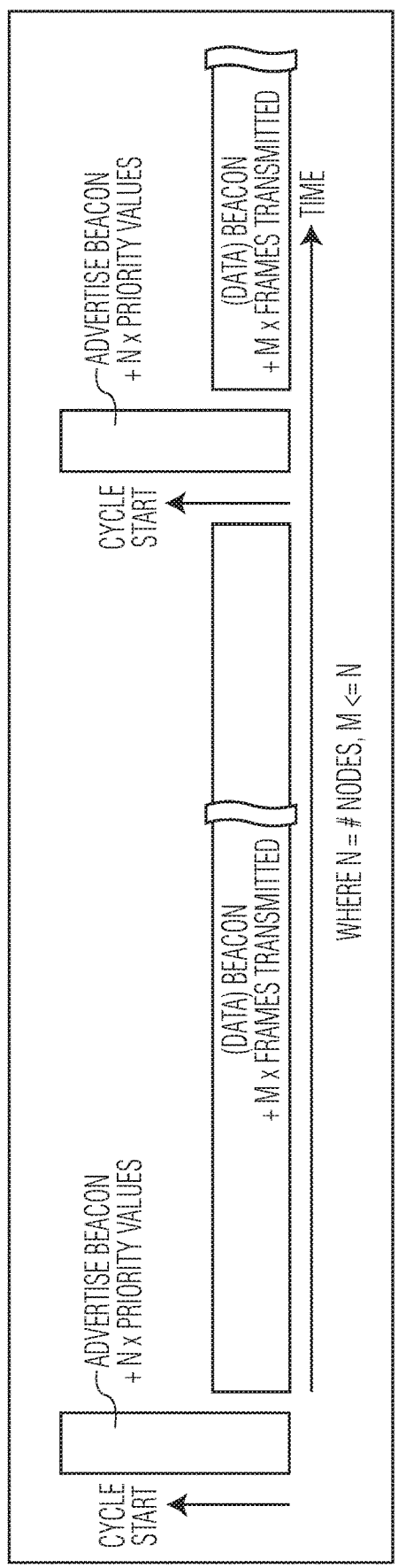
FIG. 5 depicts an example of transmission cycles in which advertisement beacons are used to communicate indications of frame priority.

FIG. 5 depicts an example of transmission cycles in an IEEE 802.3cg compliant communications network in which beacons and frames (e.g., (data) beacon+M×frames transmitted) are transmitted according to, for example, the PLCA protocol. FIG. 5 also illustrates the advertise beacons that are included in each transmission cycle to share frame priority information at the physical layer. Although only one advertise beacon is shown at the beginning of each transmission cycle, in an embodiment, an advertise beacon (or some other type of priority indication) could be initiated earlier and/or more often to allow for the injection of higher priority frames between lower priority frames. In an embodiment, if a PHY device does not have any frames to transmit, then the device may, for example, transmit a "skip" indication or if the PHY device is shut down, the PHY device may take no action. The issuing of a skip by the PHY device when its turn to transmit comes up may be helpful. The skip allows each PHY device to be configured with different "rules" where the PHY device is allowed to transmit its advertised frame, once in a defined while, even if the PHY device has a lower priority than the advertised highest value. This allows for other scheduling algorithms like a Weighted Fair Queuing scheme, for example, such that a lower priority node is not starved out, although this approach typically not used in networks that should be deterministic.

In the example described with reference to FIG. 5, an indication of frame priority is advertised at the physical layer using an advertisement beacon. However, other techniques can be used to advertise the priority at the physical layer. Additionally, other ways of implementing advertising beacons may be used.

In an embodiment, sharing frame priority on the shared media at the physical layer will consume a relatively small amount of bandwidth. For example, the transmissions of indications of frame priority may be on the order of 2-4 bytes per communications node per transmission. Typical Ethernet frames range from about 64-1,522 bytes per frame, so the 2-4 bytes consumed for priority sharing represents only a small portion of the available bandwidth. Such an overhead added at the physical layer to shared priority information is consistent with the priority overhead contained in Ethernet frames, such as 802.1Q frame, which transverse bridged networks (i.e., a 4-byte tag is added to the frame).

As indicated above, the media access priority manager 486 (FIGS. 4A and 4B) is configured to implement a physical layer media access priority scheme. In addition to managing the transmission of priority indications, the media access priority manager is also configured to receive priority indications from the other PHY devices on the shared media and to arbitrate amongst the received priorities to determine if the respective PHY device can transmit its frame. For example, the media access priority manager determines if the PHY device can send its queued frame in a subsequent (e.g., next) transmission cycle.

Figure 6:
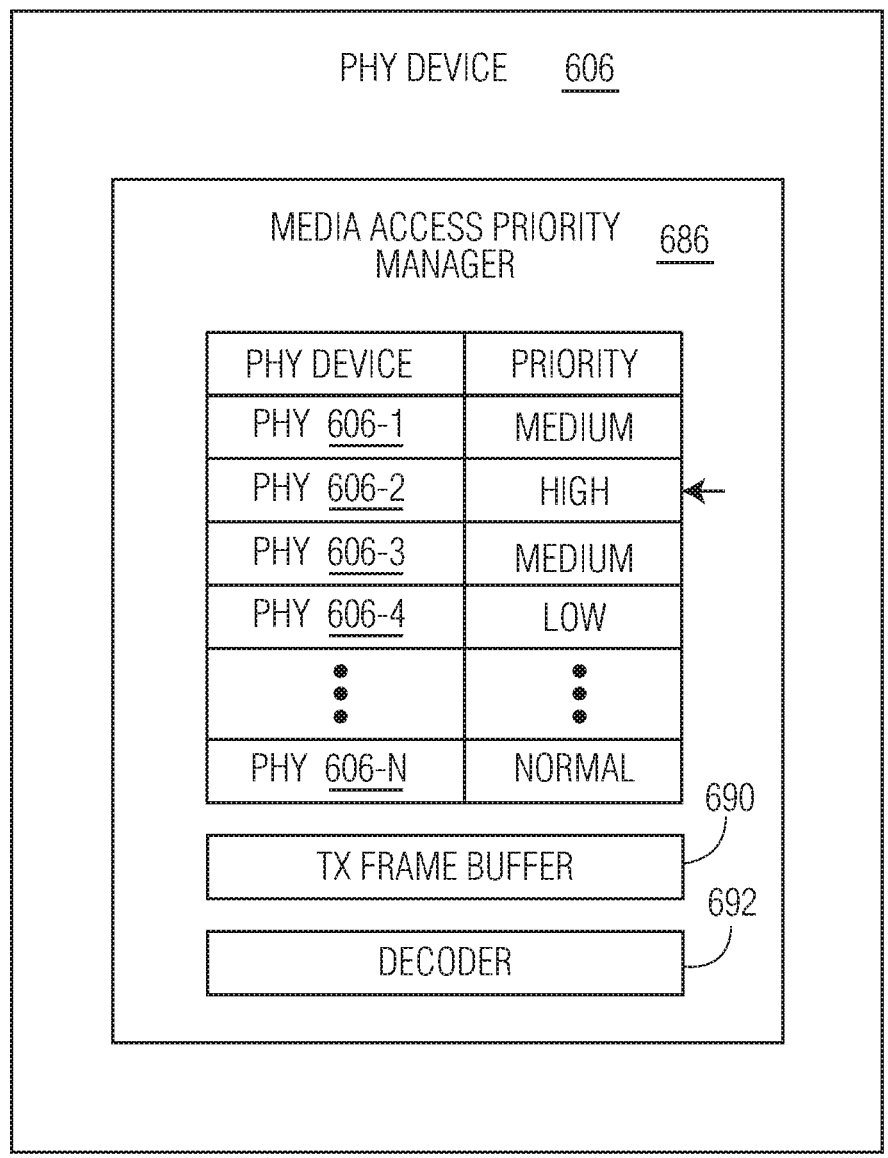
FIG. 6 depicts and example of priority information that is collected by the media access priority manager of a particular PHY device.

FIG. 6 depicts and example of priority information that is collected by the media access priority manager 686 of a particular PHY device 606, e.g., PHY device 606-1. As illustrated in FIG. 6, the media access priority manager has collected priority information for PHY devices 606-1, 606-2, 606-3, 606-4, . . . 606-N. In the example of FIG. 6, the priorities associated with each PHY device are: PHY 606-1: medium; PHY 606-2: high; PHY 606-3: medium; PHY 606-4: low; and PHY 606-N: normal. The priority associated with PHY device 606-1 (medium) is learned from within the node itself and the priorities associated the other PHY devices on the shared media are received on the shared media. In the example shown in FIG. 6, the highest priority amongst the collected priorities is associated with PHY device 606-2 (high priority). Since PHY device 606-1 does not have the highest priority, PHY device 606-1 does not get to transmit its waiting frame in the next transmission cycle. Although not shown in FIG. 6, the media access priority manager of PHY device 606-2 maintains a similar collection of device priorities and will recognize that it has the highest priority of the PHY devices on the shared media (as indicated by the arrow pointing to PHY 606-2). Thus, PHY device 606-2 is free to transmit a frame onto the shared media in the next transmission cycle. In an embodiment, the process of transmitting shared media priorities and collecting shared media priorities from other PHY devices on the shared media is repeated at each transmission cycle, e.g., each PLCA cycle in an IEEE 802.3cg network that utilizes PLCA. In the example of FIG. 6, if PHY device 606-2 does not have another high priority frame to send in the next transmission cycle (e.g., it only has a low priority frame to transmit), then PHY device 606-1 and PHY device 606-3 both have the highest priority frames to transmit (e.g., medium priority) and therefore, one of the two PHY devices will obtain the right to transmit a frame. In an embodiment, transmission priority amongst devices with the same priority frames can be determined based on another factor, such PHY device ID or a round-robin schedule. In another embodiment, the media access priority manager 686 only needs to hold a copy of the highest priority advertised by the other PHY devices on the shared media and then compare the held value to the priority of the frame it currently wants to transmit. The PHY device then makes an arbitration decision based on the comparison between the highest priority advertised by the other PHY devices on the shared media and its held priority value. In some cases, transmission priority amongst devices with the same priority frames can be determined based on another factor, such PHY device ID or a round-robin schedule.

In order for a PHY device to transmit an indication of the priority of an awaiting frame, the media access priority manager must learn the priority of the corresponding frame. If the PHY device is integrated into the same device as the MAC unit (e.g., into the same IC device), then frame priority information can be sent to the media access priority manager at the physical layer from the TX MAC via, for example, an out-of-band conductive path. In an embodiment in which the PHY device is connected to a higher layer component (e.g., a microcontroller in which the MAC unit, and Ethernet MAC layer functionality, is implemented) by an MII interface (e.g., because the PHY device is a standalone IC device), the media access priority manager of the PHY device may include a frame buffer and a frame decoder that are configured to learn the priority of the next frame that is to be transmitted from the PHY device. With reference to FIG. 6, the media access priority manager 686 includes a TX frame buffer 690 and a decoder 692. In operation, the next frame to be transmitted is received by the TX frame buffer in the PHY device from the TX MAC and at least partially decoded by the decoder to learn the priority of the frame. For example, the frame is sent to the PHY device from the TX MAC using an xMII interface between the PHY device and another IC device such as a microcontroller. While the frame is received by the PHY device, the decoder decodes enough of the frame to learn the priority of the frame using, for example, mechanisms defined in IEEE 802.1. In an embodiment, the minimum requirement is that the decoder is able to decode IEEE 802.1Q tagged frames and then the Tag priority is used as the priority of the corresponding frame. Upon decoding, the media access priority manager of the PHY device knows the frame's priority and has the frame ready to be transmitted onto the shared media (e.g., held in the TX frame buffer), all of which is accomplished without any changes to the MAC unit of the communications node or to the MII interface. Thus, the QoS scheme described herein can be implemented in a PHY device without requiring any other changes to components of the 802.3cg network. In an embodiment, to prevent the communications node from sending a next frame too quickly, the media access priority manager of the PHY device can issue a "Carrier" signal to the TX MAC to stall the TX MAC. Once the PHY device is ready for the next frame from the TX MAC, the media access priority manager of the PHY device can de-assert the Carrier signal.

Figure 7A:
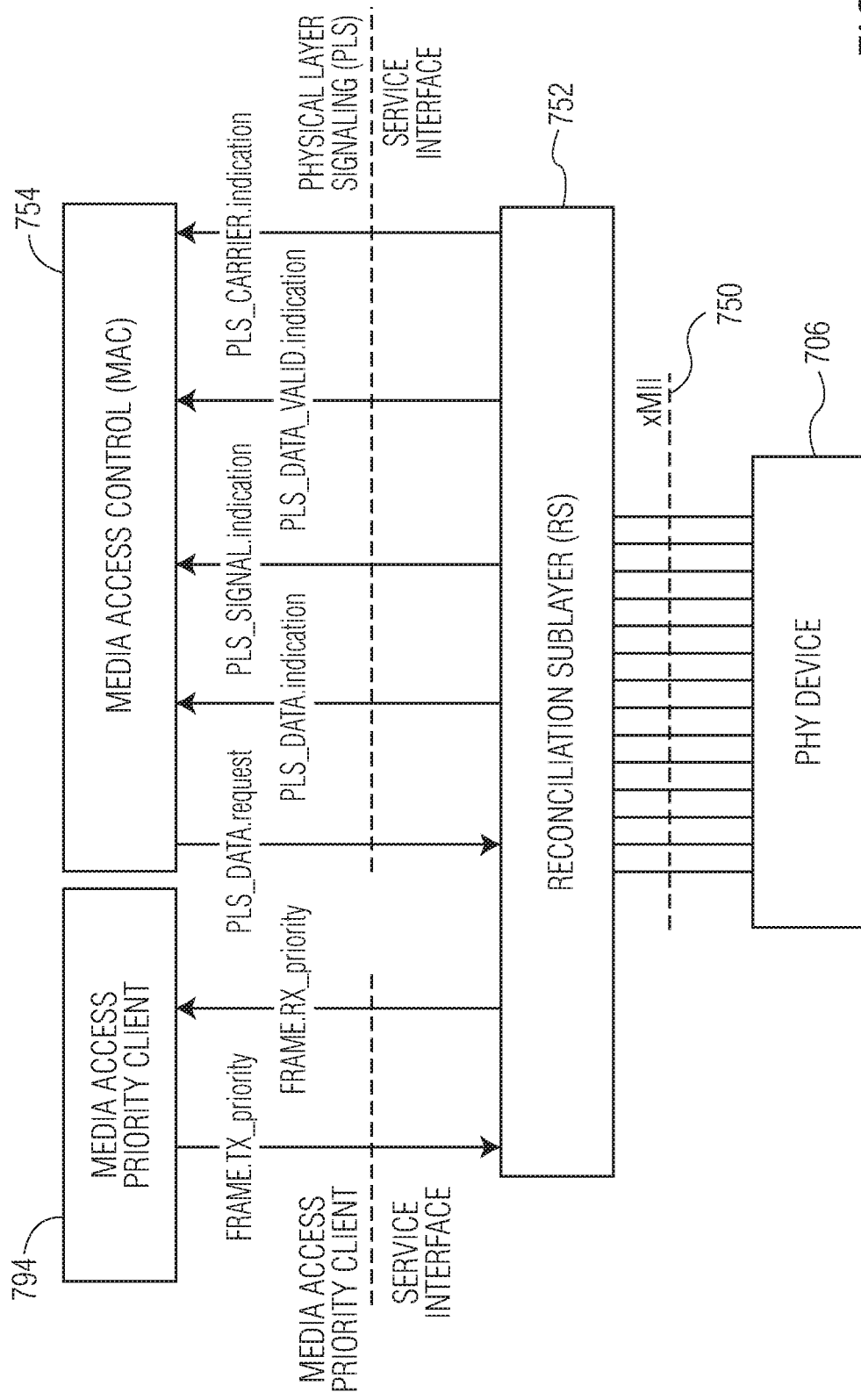
FIG. 7A illustrates an example of technique for exchanging priority information with a PHY device that utilizes a media access priority client that operates at the data link layer (layer 2).

In another embodiment, the media access priority manager in the physical layer can learn the priority of the corresponding frame from a separate priority channel that is carried over, for example, an MII interface. FIG. 7A illustrates an example of technique for exchanging priority information with a PHY device 706 that communicates with a media access priority client 794 that operates at the data link layer (layer 2). As shown in FIG. 7, the MAC layer 754 and the media access priority client communicate with the PHY device through the reconciliation sublayer 752 (see reconciliation sublayer 252/452 in FIGS. 2 and 4B) and through the MII 750 (e.g., xMII). The MAC layer communicates through a service interface as is known in the field. Priority information is communicated between the media access priority client and the reconciliation sublayer. In an embodiment, the media access priority client executes on, for example, a microcontroller and communicates frame priority information for frames that are to be transmitted from the PHY device via, for example, a transmit priority message ("FRAME.TX.priority"). The media access priority client may also receive information related to the priority of the frames that are awaiting transmission by the other PHY devices on the shared media via a receive priority message ("FRAME.RX.priority").

Figure 7B:
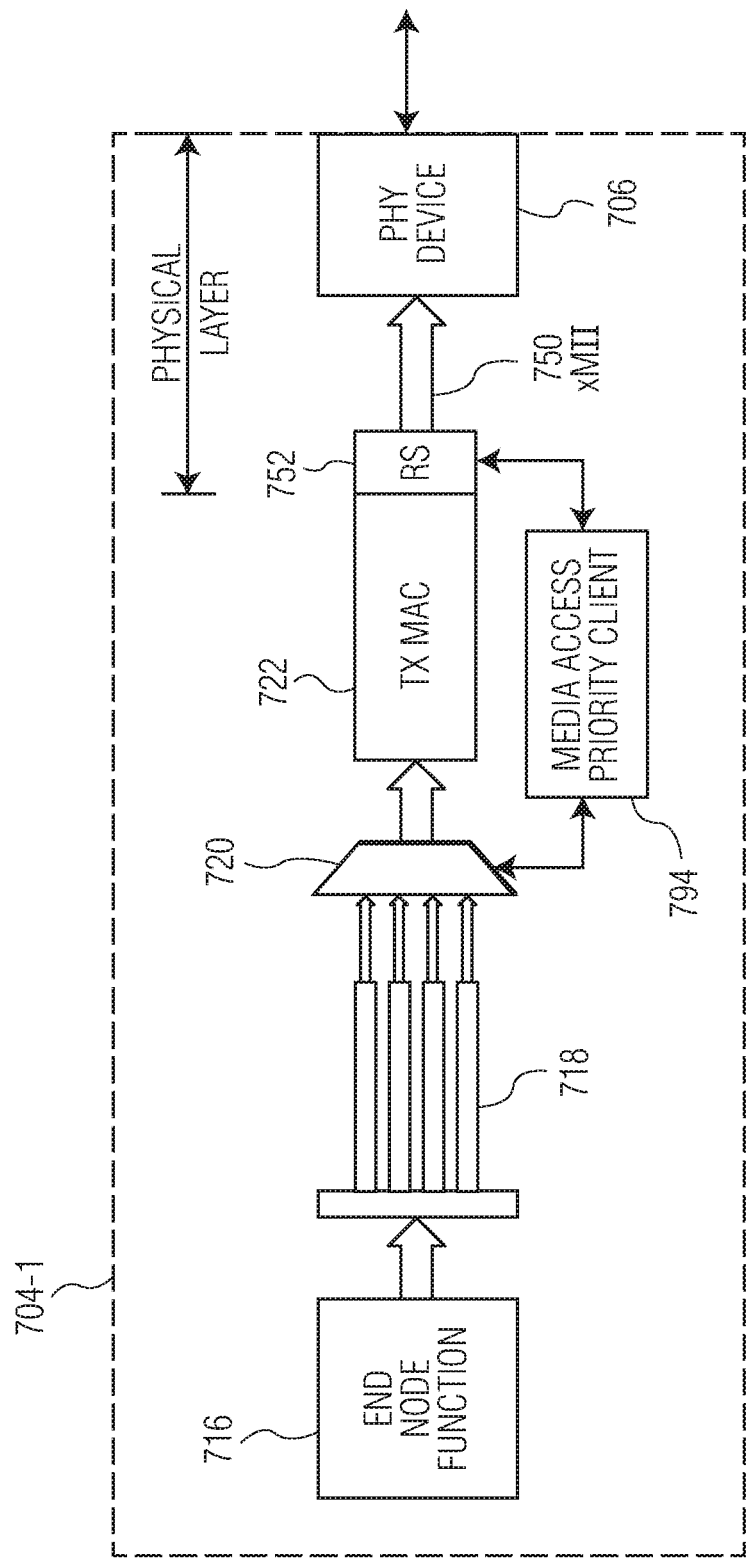
FIG. 7B depicts a communications node that includes a media access priority client.

FIG. 7B depicts an expanded view of a communication node 704-1 that communicates over a shared media (not shown) according to the IEEE 802.3cg protocol and includes an end node function 716, four transmit QoS queues 718 (e.g., high, medium, normal, and low), a frame selector 720, a TX MAC 722, and a PHY device 706. The communications node is similar to the communications nodes shown in FIG. 3 although the RX MAC 312 receive FIFO 314 are not shown and the node includes a media access priority client 794 that is configured to communicate frame priority information between the frame selector 720 and the reconciliation sublayer 752 of the physical layer. As shown in FIG. 7B, the reconciliation sublayer (RS) is connected to the PHY device 706 via an xMII interface 750. In the example, the media access priority client learns the priority of the next frame from the frame selector and provides the priority to the media access priority manager (e.g., FIGS. 4A and 4B, element 486) at the PHY device for transmission onto the shared media.

In an embodiment, a PLCA block resides in the reconciliation sublayer (FIG. 2, element 252) and the PHY device does not include a PLCA block. In this case, the PLCA block has to send "codes" up and down the stack via the MII interface so that the PCS will generate the beacons as specified in the standard. In an embodiment, the sharing of priority information may involve sending codes for priority indications via the MII interface. Such an approach involves the modification of the capabilities of both sides of the MII. In another embodiment, priority information by be communicated to the PHY device through an interface such as an SPI interface. In such a case, the media access priority client 794 can be implemented in software (e.g., in a microcontroller) that the priority of the next frame to transmit can be indicated via registers.

In another embodiment, the TX MACs are modified to include a frame priority indication in the preamble of frames. Since both sides of the xMII interface would be new devices, the preamble of a frame could be sent from the TX MAC to the PHY device and the PHY device could issue Carrier signal to stall the MAC unit from sending the rest of the frame (this is a change to the MAC layer as normally the Carrier signal would be ignored once a MAC unit starts sending a frame). Such a modification would allow the PHY device to be built without the need for a TX frame buffer. But, the cost of 1.5K bytes of TX frame buffer is relatively small in the overall IC device framework.

In an embodiment, the priority of the frames is determined based on protocols defined by the IEEE 802.1 working group. For example, the priority is defined by standards or protocols defined by the Time-Sensitive Network (TSN) Task Group part of the IEEE 802.1 Working Group. Using the above-described techniques, QoS features defined in IEEE 802.1 can be translated to QoS features that are implemented at PHY layer, e.g., through IEEE 802.3cg.

Figure 8:
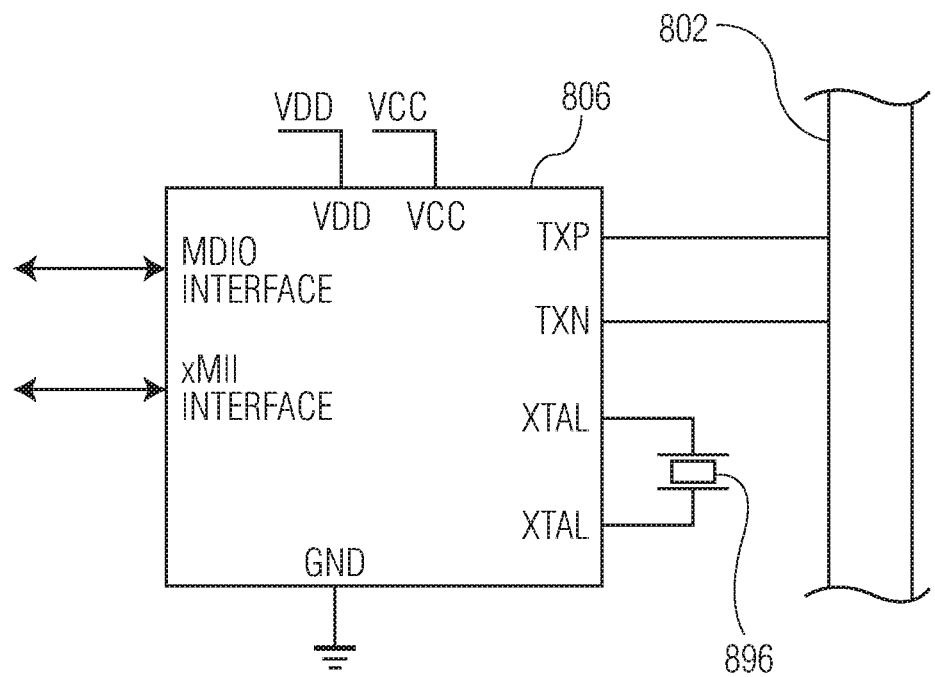
FIG. 8 depicts an embodiment of a PHY device that is embodied as a standalone IC device or "chip."

In an embodiment, the above-described technique for adding QoS in an IEEE 802.3 Ethernet network that utilizes CSMA/CD is implemented at least in part in an integrated circuit (IC) device that is referred to as a PHY device or PHY chip. FIG. 8 depicts an embodiment of a PHY device 806 that is embodied as a standalone IC device or "chip." The IC chip includes an MDIO interface, an xMII interface, a VDD input, a VCC input, a ground interface (GND), a crystal oscillator interfaces, and transmission media interfaces (transmission media positive (TXP) and transmission media negative (TXN). For illustration purposes, the IC chip is shown with connections to external devices that include a crystal oscillator 896 (XTAL) (optional) and the shared media 802. In other embodiment, the PHY chip may include a different interface to other chips, such as an SPI interface. In an embodiment, the PHY chip includes elements as shown in FIG. 4B, including the media access priority manager. In an embodiment, the functionality of the media access priority manager is implemented in hardware (e.g., circuits), although the functionality could be implemented in hardware, software, firmware, or a combination thereof.

Figure 9:
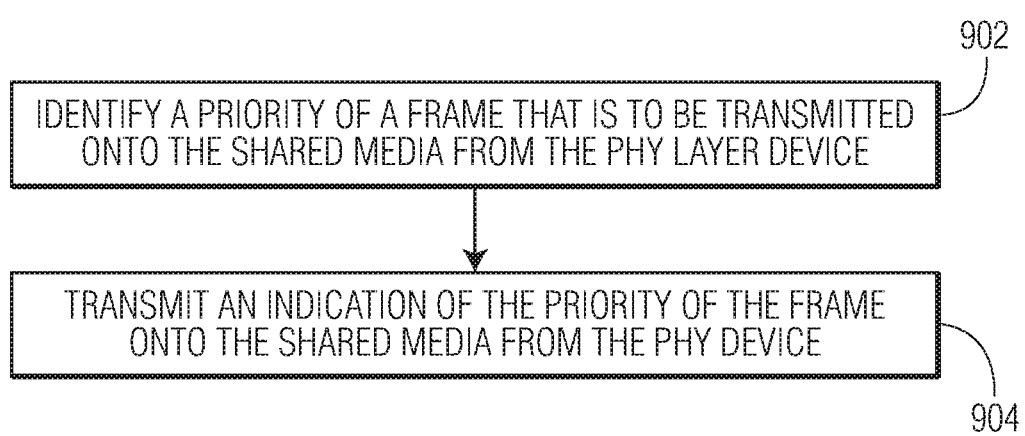
FIG. 9 is a process flow diagram of a method of operating a PHY device on a communications network that utilizes a shared media.

FIG. 9 is a process flow diagram of a method of operating a PHY device on a communications network that utilizes a shared media, for example, a PHY device that is compatible the IEEE 802.3 standard and that utilizes CSMA/CD for media access control to a shared media. According to the method, at block 902, a priority of a frame that is to be transmitted onto the shared media from the PHY layer device is identified. At block 904, an indication of the priority of the frame is transmitted onto the shared media from the PHY device.

In an embodiment, the size of frames at a given priority level can be taken into account to adjust (e.g., via additional bits in transmission of the priority indication, e.g., the priority advertisement) when a PHY device is allowed to transmit. In a strict priority selection queuing system, frame size is generally ignored, but frame size could be considered if is desirable to implement an alternate selection/arbitration algorithm.

Although the operations of the method(s) herein are shown and described in a particular order, the order of the operations of each method may be altered so that certain operations may be performed in an inverse order or so that certain operations may be performed, at least in part, concurrently with other operations. In another embodiment, instructions or sub-operations of distinct operations may be implemented in an intermittent and/or alternating manner.

It should also be noted that at least some of the operations for the methods described herein may be implemented using software instructions stored on a computer useable storage medium for execution by a computer. As an example, an embodiment of a computer program product includes a computer useable storage medium to store a computer readable program.

The computer-useable or computer-readable storage medium can be an electronic, magnetic, optical, electromagnetic, infrared, or semiconductor system (or apparatus or device). Examples of non-transitory computer-useable and computer-readable storage media include a semiconductor or solid state memory, magnetic tape, a removable computer diskette, a random access memory (RAM), a read-only memory (ROM), a rigid magnetic disk, and an optical disk. Current examples of optical disks include a compact disk with read only memory (CD-ROM), a compact disk with read/write (CD-R/W), and a digital video disk (DVD).

Alternatively, embodiments of the invention may be implemented entirely in hardware or in an implementation containing both hardware and software elements. In embodiments which use software, the software may include but is not limited to firmware, resident software, microcode, etc.

Although specific embodiments of the invention have been described and illustrated, the invention is not to be limited to the specific forms or arrangements of parts so described and illustrated. The scope of the invention is to be defined by the claims appended hereto and their equivalents.

What is claimed is:

1. A physical layer (PHY) device that is compatible with the IEEE 802.3 standard and that utilizes carrier-sense multiple access with collision detection (CSMA/CD) for media access control (MAC) to a shared media, the PHY device comprising:
a physical coding sublayer transmitter (PCS-TX);
a physical medium attachment transmitter (PMA-TX);
a physical coding sublayer receiver (PCS-RX);
a physical medium attachment receiver (PMA-RX); and
a media access priority manager configured to operate above the PCS-TX and below a CSMA/CD MAC layer and to initiate transmission of an indication of a priority of a frame that is to be transmitted onto the shared media;
wherein the media access priority manager is further configured to:
receive priorities of frames to be transmitted onto the shared media from other PHY devices that are connected to the shared media, wherein the priorities are received via beacons sent from the other PHY devices; and
determine whether or not to transmit its frame onto the shared media based on an arbitration between the priority of its frame relative to the priorities of the frames to be transmitted from the other PHY devices that were received at the media access priority manager from the other PHY devices that are connected to the shared media;
wherein the media access priority manager in the PHY device is configured to indicate the priority of its frame by transmitting an indication of priority in a media access priority beacon that is generated in the PHY device.

2. The PHY device of claim 1, wherein the PHY device is compatible with IEEE 802.3cg.

3. The PHY device of claim 1, wherein the media access priority manager is configured to initiate transmission of its frame if the priority of its frame is higher than the priorities of all the frames to be transmitted from the other PHY devices.

4. The PHY device of claim 1, wherein the media access priority manager is configured to initiate transmission of its frame if the priority of its frame matches a highest priority from the priorities of all the frames to be transmitted from the other PHY devices.

5. The PHY device of claim 1, wherein the media access priority manager is configured to learn the priority of its frame through an MII interface.

6. The PHY device of claim 1, wherein the media access priority manager is configured to learn the priority of its frame through a serial peripheral interface (SPI).

7. The PHY device of claim 1, wherein the media access priority manager is configured to learn the priority of its frame through information in a header of the frame.

8. A method of operating a physical layer (PHY) device that is compatible the IEEE 802.3 standard and that utilizes carrier-sense multiple access with collision detection (CSMA/CD) for media access control (MAC) to a shared media, the method comprising:
identifying a priority of a frame that is to be transmitted onto the shared media from the PHY layer device; and
transmitting an indication of the priority of the frame onto the shared media from the PHY device;
wherein the PHY device is compatible with IEEE 802.3cg, and wherein the PHY device comprises:
a physical coding sublayer transmitter (PCS-TX);
a physical medium attachment transmitter (PMA-TX);
a physical coding sublayer receiver (PCS-RX);
a physical medium attachment receiver (PMA-RX); and
a media access priority manager configured to operate above the PCS-TX and below a CSMA/CD MAC layer and to initiate transmission of the indication of a priority of a frame that is to be transmitted onto the shared media;
further comprising:
receiving priorities of frames to be transmitted onto the shared media from other PHY devices that are connected to the shared media; wherein the priorities are received via beacons sent from the other PHY devices; and
determining whether or not to transmit its frame onto the shared media based on an arbitration between the priority of its frame relative to the priorities of the frames to be transmitted from the other PHY devices that were received at the media access priority manager from the other PHY devices that are connected to the shared media;
wherein the media access priority manager in the PHY device is configured to indicate the priority of its frame by transmitting an indication of priority in a media access priority beacon that is generated in the PHY device.

9. The method of claim 6, wherein the indication of the priority of the frame is transmitted onto the shared media from the PHY device according to IEEE 802.3cg.

10. The method of claim 8, further comprising initiating transmission of its frame if the priority of its frame is higher than the priorities of all the frames to be transmitted from the other PHY devices.

11. The method of claim 8, further comprising learning the priority of its frame through an MII interface.

12. The method of claim 8, further comprising learning the priority of its frame through a serial peripheral interface (SPI).

13. The method of claim 8, further comprising learning the priority of its frame through information in a header of the frame.

14. A communications network comprising:
a shared media, wherein the shared media is a twisted-pair wire;
multiple physical layer (PHY) devices connected to the shared media and compatible with the IEEE 802.3 standard and that utilize carrier-sense multiple access with collision detection (CSMA/CD) for media access control (MAC) to the shared media, each PHY device comprising:
a physical coding sublayer transmitter (PCS-TX);
a physical medium attachment transmitter (PMA-TX);
a physical coding sublayer receiver (PCS-RX);
a physical medium attachment receiver (PMA-RX); and
a media access priority manager configured to operate above the PCS-TX and below a CSMA/CD MAC layer and to:

initiate transmission of an indication of a priority of a frame that is to be transmitted onto the shared media;

receive priorities of frames to be transmitted onto the shared media from other PHY devices that are connected to the shared media, wherein the priorities are received via beacons sent from the other PHY devices; and determine whether or not to transmit its frame onto the shared media based on an arbitration between the priority of its frame relative to the priorities of the frames to be transmitted from the other PHY devices that were received at the media access priority manager from the other PHY devices that are connected to the shared media:

wherein the media access priority manager in the PHY device is configured to indicate the priority of its frame by transmitting an indication of priority in a media access priority beacon that is generated in the PHY device.

15. The communications network of claim 14, wherein the media access priority manager is configured to initiate transmission of its frame if the priority of its frame is higher than the priorities of all the frames to be transmitted from the other PHY devices.

* * * * *